United States Patent
Balk et al.

(10) Patent No.: US 8,530,574 B2
(45) Date of Patent: Sep. 10, 2013

(54) AQUEOUS POLYMER DISPERSION AND USE THEREOF AS BINDER FOR COATING SUBSTRATES

(75) Inventors: Roelof Balk, Boehl-Iggelheim (DE); Franca Tiarks, Shanghai (CN); Arno Tuchbreiter, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 59 days.

(21) Appl. No.: 13/384,607

(22) PCT Filed: Jul. 19, 2010

(86) PCT No.: PCT/EP2010/060429
§ 371 (c)(1), (2), (4) Date: Jan. 18, 2012

(87) PCT Pub. No.: WO2011/009838
PCT Pub. Date: Jan. 27, 2011

(65) Prior Publication Data
US 2012/0196972 A1 Aug. 2, 2012

(30) Foreign Application Priority Data
Jul. 22, 2009 (EP) .................. 09166119

(51) Int. Cl.
| | | |
|---|---|---|
| C09D 133/26 | (2006.01) | |
| C09D 133/08 | (2006.01) | |
| C09D 133/02 | (2006.01) | |
| C08L 81/06 | (2006.01) | |
| C08L 81/00 | (2006.01) | |
| C08L 85/02 | (2006.01) | |

(52) U.S. Cl.
USPC ........... 524/817; 524/556; 524/558; 524/814; 524/832; 524/833; 526/287

(58) Field of Classification Search
USPC .............. 526/287; 524/556, 558, 814, 817, 524/832, 833
See application file for complete search history.

(56) References Cited

U.S. PATENT DOCUMENTS

| | | | |
|---|---|---|---|
| 4,049,604 A | * | 9/1977 | Morehouse et al. .......... 524/460 |
| 4,269,749 A | | 5/1981 | Marriott et al. |
| 2010/0204394 A1 | | 8/2010 | Balk et al. |
| 2011/0152441 A1 | | 6/2011 | Hartig et al. |
| 2011/0245401 A1 | | 10/2011 | Elizalde et al. |

FOREIGN PATENT DOCUMENTS

| | | |
|---|---|---|
| DE | 196 24 299 | 1/1997 |
| DE | 196 09 509 | 9/1997 |
| DE | 196 21 027 | 11/1997 |
| DE | 197 41 184 | 3/1999 |
| DE | 197 41 187 | 3/1999 |
| DE | 198 05 122 | 4/1999 |
| DE | 198 28 183 | 12/1999 |
| DE | 198 39 199 | 3/2000 |
| DE | 198 40 586 | 3/2000 |
| DE | 198 47 115 | 5/2000 |
| EP | 0 710 680 | 5/1996 |
| EP | 0 771 328 | 5/1997 |
| EP | 0 690 882 | 1/1998 |
| EP | 1 125 949 | 8/2001 |
| EP | 1 294 816 | 3/2003 |
| EP | 1 614 732 | 1/2006 |
| WO | 03 029300 | 4/2003 |
| WO | 2008 152017 | 12/2008 |

OTHER PUBLICATIONS

International Search Report Issued Apr. 5, 2011 in PCT/EP10/60429 Filed Jul. 19, 2010.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

The present invention provides aqueous finely divided polymer dispersions which at low temperatures are film-forming, exhibit good blocking resistance in a formulation, even at elevated temperatures, and display a low foam tendency, processes for preparing them, and their use as binders for coating substrates.

14 Claims, No Drawings

AQUEOUS POLYMER DISPERSION AND USE THEREOF AS BINDER FOR COATING SUBSTRATES

The present invention provides aqueous finely divided polymer dispersions which at low temperatures are film-forming, exhibit good blocking resistance in a formulation, even at elevated temperatures, and display a low foam tendency, processes for preparing them, and their use as binders for coating substrates.

Aqueous polymer dispersions are common knowledge. They are fluid systems which comprise, in dispersed distribution as a disperse phase in the aqueous dispersion medium, polymer coils which are composed of a plurality of intertwined polymer chains, these coils being referred to as the polymer matrix or polymer particles. The average diameter of the polymer particles is frequently in the range from 10 to 1000 nm, more particularly in the range from 30 to 300 nm. Aqueous polymer dispersions are used as binders in a multiplicity of industrial applications.

Where they are used as binders for coatings on substrates, one of the important requirements of such coatings is that they possess a certain hardness and hence exhibit good scratch resistance and blocking resistance. For environmental reasons, filming of the binder in the range from 0 to 40° C. is desired, and so only small amounts of a film-forming assistant, or none, are required. Another requirement is a high fine division. This allows the preparation of transparent aqueous stains and allows effective penetration of the stain into the substrate, particularly when the substrate to be coated is wood.

From EP-B 0 710 680 it is known that, by means of multistage emulsion polymerization, it is possible to prepare polymer dispersions which have a low minimum film-forming temperature (MFFT) and form films having high blocking resistance. Such polymer dispersions have an average polymer particle diameter of <100 nm. The fine division, however, is not enough in the majority of cases for the formulation therewith in the wet state of desired transparent stains for wood coatings. Wood stains are wood coatings which in the dry state are transparent or semitransparent. They comprise transparent pigments (e.g., transparent, ultrafine iron oxide) in such a small amount that the structure of the wood is still visible.

Where the particle size of the polymer particles to be prepared by means of the free-radically initiated aqueous emulsion polymerization is to be set specifically, it is usual to use what is called a polymer seed, which either has been prepared separately beforehand with different monomers (exogenous polymer seed) or which has been generated by part-polymerization of the monomers to be polymerized "in situ". Particularly when preparing finely divided polymer dispersions, it is preferred to use this "in situ" polymer seed.

The preparation of an aqueous polymer dispersion using an "in situ" polymer seed is familiar to the person skilled in the art (see, for example, DE-A 196 09 509, EP-A 690882, EP-A 710 680, EP-A 1 125 949, EP-A 1 294 816, EP-A 1 614 732, WO-A 03/29300) and is generally accomplished by introducing a small portion of the monomer mixture used for the emulsion polymerization into the aqueous polymerization medium before the actual emulsion polymerization, and subjecting it to free-radical polymerization in the presence of a relatively large amount of emulsifier. If the need is for particularly finely divided polymer dispersions, a particularly large amount of emulsifier is used. The resultant polymer dispersions, very rich in emulsifier as a consequence, have a tendency toward severe foaming.

It was an object of the present invention, therefore, to prepare a binder in the form of an aqueous finely divided polymer dispersion, having an average particle size of ≦60 nm, with a low amount of emulsifier (<2 parts by weight per 100 parts by weight of the total amount of monomers), with low MFFT, in the range of 0°-20° C., and with good blocking resistance. With these polymer dispersions it ought to be possible to produce stains that are transparent in the wet state.

Surprisingly this object has been achieved by means of aqueous polymer dispersions obtainable through first the preparation of an "in situ" seed, comprising hydrophilic and hydrophobic monomers, by first introducing, in an aqueous polymerization medium, only
0.1% to 10% by weight of the total amount of the at least one monomer A and/or B and also
0.1% to 10% by weight of a hydrophilic monomer having the general formula

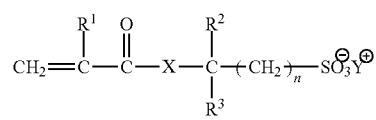

in which the variables have the following definition:
n=0 to 2
$R^1$, $R^2$, $R^3$=independently of one another hydrogen or a methyl group
X=oxygen or the imino group (NH), and
Y=hydrogen, alkali metal or ammonium
(monomer composition I), and carrying out polymerization in the presence of at least one emulsifier and a free-radical initiator (polymerization stage 1),
thereupon polymerizing a copolymer having a monomer composition II (polymerization stage 2) comprising
40%-60% by weight of monomers A whose homopolymers possess a glass transition temperature below 20° C.
15%-30% by weight of monomers B whose homopolymers possess a glass transition temperature above 50° C.
0.1%-5% by weight of α,β-unsaturated carboxylic, sulfonic, phosphonic acids and/or carboxamides copolymerizable with monomers B [monomers C]
0%-5% by weight of ethylenically unsaturated monomers comprising keto groups, and/or non-C, ethylenically unsaturated, and nitrogen-comprising adhesion monomers [monomers D]
0%-5% by weight of other ethylenically unsaturated monomers E
and, in a third polymerization stage, polymerizing a copolymer having a monomer composition III, comprising
0%-5% by weight of monomers A whose homopolymers possess a glass transition temperature below 20° C.
10%-30% by weight of monomers B whose homopolymers possess a glass transition temperature above 50° C.
0.1%-5% by weight of α,β-unsaturated carboxylic, sulfonic or phosphonic acids and/or carboxamides copolymerizable with monomers B [monomers C]
0%-5% by weight of ethylenically unsaturated monomers comprising keto groups, and/or non-C, ethylenically unsaturated, and nitrogen-comprising adhesion monomers [monomers D]
0%-5% by weight of other ethylenically unsaturated monomers E,
the sum of monomer compositions I+II+III being in each case 100%

The present invention likewise provides a process for preparing the aqueous polymer dispersions, and also their use as binders for coatings on substrates, more particularly their use in paints, especially for wood coatings, and also the polymer powders obtainable from these aqueous polymer dispersions, and also coating materials comprising the aqueous polymer dispersion.

The glass transition temperature $T_g$ refers to the limiting value of the glass transition temperature to which the latter tends with increasing molecular weight, according to G. Kanig (Kolloid-Zeitschrift & Zeitschrift für Polymere, vol. 190, p. 1, equation 1); it is determined by the DSC method (Differential Scanning calorimetry, 20 K/min, midpoint).

According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980) the glass transition temperature of copolymers with no more than low degrees of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the polymers constructed in each case only from one of the monomers 1, 2, ... n. The $T_g$ values for the homopolymers of the majority of monomers are known and are listed, for example in Ullmann's Encyclopedia of Industrial Chemistry, vol. A21, page 169, 5th edition, VCH Weinheim, 1992; examples of other sources of homopolymer glass transition temperatures include J. Brandrup, E. H. Immergut, Polymer Handbook, $1^{st}$ edn., J. Wiley, New York 1966, $2^{nd}$ edn. J. Wiley, New York 1975, and $3^{rd}$ edn. J. Wiley, New York 1989.

Suitable monomers A) are, for example, branched and unbranched ethylenically unsaturated $C_3$-$C_{10}$ olefins, $C_1$-$C_{10}$ alkyl acrylates, $C_5$-$C_{10}$ alkyl methacrylates, $C_5$-$C_{10}$ cycloalkyl(meth)acrylates, $C_1$-$C_{10}$ dialkyl maleates and/or $C_1$-$C_{10}$ dialkyl fumarates.

It is preferred to use those monomers A) whose homopolymers have glass transition temperatures below 0° C.

More particularly preferred for use as monomers A) are ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate or 2-propylheptyl acrylate.

The homopolymers of the monomers B) have a glass transition temperature >50° and preferably >80°. Use is made, for example, of styrene, α-methylstyrene, o- or p-vinyltoluene, vinyl chloride, vinylidene chloride, acrylonitrile, methacrylonitrile, and also $C_1$-$C_4$ alkyl esters or $C_1$-$C_4$ cycloalkyl esters of methacrylic acid, examples being methyl methacrylate, cyclohexyl methacrylate, isobornyl methacrylate and tert-butyl methacrylate.

The binder polymers of the invention may comprise, as monomers C) ethylenically unsaturated monomers which can form anionic groups. These groups are preferably carboxylate, phosphonate or sulfonate groups.

Preferred monomers C) are monoethylenically unsaturated alkylsulfonic or arylsulfonic acids such as vinylsulfonic acid, methallylsulfonic acid, vinylbenzenesulfonic acid, acrylamidoethanesulfonic acid, acrylamidopropanesulfonic acid, 2-sulfoethyl(meth)acrylate, sulfopropyl(meth)acrylate, monoethylenically unsaturated phosphonic and sulfonic acids, e.g. vinylphosphonic acid and allylphosphonic acid, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids and 2-acrylamido-2-methylpropanesulfonic acid, styrenesulfonic acids and their derivatives, such as styrene-4-sulfonic acid and styrene-3-sulfonic acid, and also the salts, more particularly the alkaline earth metal salts or alkali metal salts of the aforementioned acids, such as sodium styrene-3-sulfonate and sodium styrene-4-sulfonate, and also α,β-unsaturated $C_3$-$C_6$ carboxylic acids, α,β-unsaturated $C_4$-$C_8$-dicarboxylic acids or their anhydrides, such as acrylic acid, methacrylic acid, crotonic acid, fumaric acid, maleic acid, maleic anhydride, itaconic acid and itaconic anhydride and also the alkali metal salts or ammonium salts of the stated monomers, more particularly their sodium salts.

As monomers C) it is possible furthermore to use the amides and the hydroxyalkyl esters of α,β-unsaturated $C_3$-$C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate. The monomers C) can be used individually or else in combinations of, for example, acids and amides.

Suitable monomers D) are N-vinylpyrrolidone, N-(2-methacryloyloxyethyl)ethyleneurea, N-(2-acryloyloxyethyl) ethyleneurea, 2-acetoacetoxyethyl acrylate, 2-acetoacetoxyethyl methacrylate, diacetoneacrylamide.

Beside the stated monomers A), B), C) and D), the binder polymers of the invention may also comprise other monomers E), in order to give the respective coating materials a higher strength. These monomers normally have at least one epoxy group or at least two nonconjugated ethylenically unsaturated double bonds.

Examples of monomers E are monomers containing two vinyl radicals, monomers containing two vinylidene radicals and monomers containing two alkenyl radicals. Particularly advantageous in this context are the diesters of dihydric alcohols with α,β-monoethylenically unsaturated monocarboxylic acids, among which acrylic acid and methacrylic acid are preferred. Examples of monomers of this kind containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates, 1,6-hexane glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, 1,6-hexanediglycol dimethacrylate and also divinylbenzene, vinyl methacrylate, vinyl acrylate, allyl methacrylate, allyl acrylate, diallyl maleate, diallyl fumarate, cyclopentadienyl acrylate, triallyl cyanurate or triallyl isocyanurate. Other examples of such monomers are also monomers comprising siloxane groups, such as the vinyltrialkoxysilanes, e.g., vinyltrimethoxysilane, vinyltriethoxysilane, alkylvinyldialkoxysilanes or (meth)acryloyloxyalkyltrialkoxysilanes, e.g., (meth)acryloyloxyethyltrimethoxysilane, (meth)acryloyloxypropyltrimethoxysilane.

The stated monomers E) can be used in amounts of 0.05 to 1, preferably 0.05 to 0.5, part by weight, based on 100 parts by weight of monomers A) plus B).

In accordance with the invention, in the context of the present process, dispersants are used which maintain not only the monomer droplets but also the resultant polymer particles in disperse distribution in the aqueous medium, and so ensure the stability of the aqueous polymer dispersion produced. Dispersants contemplated include emulsifiers as well as the protective colloids that are typically used to carry out free-radical aqueous emulsion polymerizations.

Suitable protective colloids are, for example polyvinyl alcohols, polyalkylene glycols, alkali metal salts of polyacrylic acids and polymethacrylic acids, gelatin derivatives or acrylic acid, methacrylic acid, maleic anhydride, 2-acrylamido-2-methylpropanesulfonic acid and/or 4-styrenesulfonic acid copolymers and their alkali metal salts, but also N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylate, methacrylate, acrylamide and/or methacrylamide homopolymers and copolymers. A comprehensive description of other suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pages 411 to 420.

It will be appreciated that mixtures of protective colloids and/or emulsifiers can also be used. As dispersants it is common to use exclusively emulsifiers, whose relative molecular weights, in contradistinction to the protective colloids are typically below 1000. They may be anionic, cationic or nonionic in nature. It will be appreciated that, in the case where mixtures of surface-active substances are used, the individual components must be compatible with one another, something which in case of doubt can be ascertained by means of a few preliminary tests. Generally speaking, anionic emulsifiers are compatible with one another and with nonionic emulsifiers, the same applies to cationic emulsifiers, whereas anionic and cationic emulsifiers are usually not compatible with one another. An overview of suitable emulsifiers is found in Houben-Weyl, Methoden der organischen Chemie, volume XIV/1, Makromolekulare Stoffe [Macromolecular compounds], Georg-Thieme-Verlag, Stuttgart, 1961, pages 192 to 208.

As dispersants in accordance with the invention, however, emulsifiers are used in particular.

Customary nonionic emulsifiers are, for example, ethoxylated mono-, di- and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ oxo-process alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo-process alcohol ethoxylates, EO degree: 3 to 11) and the Lutensol® TO grades ($C_{13}$ oxo-process alcohol ethoxylates, EO degree: 3 to 20) from BASF SE.

Examples of typical anionic emulsifiers are alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Other anionic emulsifiers which have proven suitable, furthermore are compounds of the general formula (I)

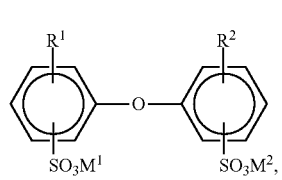

(I)

in which $R^1$ and $R^2$ are H atoms or $C_4$ to $C_{24}$ alkyl and are not simultaneously H atoms, and $M^1$ and $M^2$ may be alkali metal ions and/or ammonium ions. In the general formula (I), $R^1$ and $R^2$ are preferably linear or branched alkyl radicals having 6 to 18 C atoms, more particularly having 6, 12 and 16 C atoms or hydrogen, where $R^1$ and $R^2$ are not both simultaneously H atoms. $M^1$ and $M^2$ are preferably sodium, potassium or ammonium, with sodium being particularly preferred. Particularly advantageous compounds (I) are those in which $M^1$ and $M^2$ are sodium, $R^1$ is a branched alkyl radical having 12 C atoms and $R^2$ is an H atom or $R^1$. Frequently use is made of technical mixtures which have a fraction of 50 to 90% by weight of the monoalkylated product, such as Dowfax® 2A1 (brand of the Dow Chemical Company), for example. The compounds (I) are common knowledge from U.S. Pat. No. 4,269,749, for example, and are available commercially.

Suitable cationic emulsifiers are generally $C_6$ to $C_{18}$ alkyl-, $C_6$ to $C_{18}$ alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Examples include dodecylammonium acetate or the corresponding sulfate, the sulfates or acetates of the various 2-(N, N,N-trimethylammonio)ethylparaffinic esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and the gemini surfactant N,N'-(lauryldimethyl)ethylenediamine disulfate, ethoxylated tallow fatty alkyl-N-methylammonium sulfate and ethoxylated oleylamine (for example, Uniperol® AC from BASF AG, about 12 ethylene oxide units). Numerous other examples are found in H. Stache, Tensid-Taschenbuch, Carl-Hanser-Verlag, Munich, Vienna, 1981 and in McCutcheon's Emulsifiers & Detergents, MC Publishing Company, Glen Rock, 1989. It is favorable if the anionic counter-groups have a very low nucleophilicity, such as, for example perchlorate, sulfate, phosphate, nitrate and carboxylates, such as acetate, trifluoroacetate, trichloroacetate, propionate, oxalate, citrate, benzoate, for example, and also conjugated anions of organosulfonic acids, such as, for example methylsulfonate, trifluoromethylsulfonate and para-toluenesulfonate, and also tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers used with preference as dispersants are used advantageously in a total amount $\geq 0.1$ and $\leq 10\%$ by weight, preferably $\geq 0.1$ and $\leq 5\%$ by weight, more particularly $\geq 0.5$ and $\leq 4\%$ by weight, based in each case on the total monomer amount.

The total amount of the protective colloids used as dispersants in addition to or instead of the emulsifiers is often $\geq 0.1\%$ and $\leq 10\%$ by weight and frequently $\geq 0.2$ and $\leq 7\%$ by weight, based in each case on the total monomer amount.

It is preferred, however, to use anionic and/or nonionic emulsifiers, and with particular preference anionic emulsifiers, as dispersants.

In accordance with the invention, at least a portion of the dispersants is included in the initial charge in the aqueous polymerization medium together with the portion of the monomers A and/or B and also of the compound of the general formula I, in polymerization stage 1, and any remainder is metered into the aqueous polymerization medium in polymerization stages 2 and 3, discontinuously, in one or more portions, or continuously with constant or varying volume flows, more particularly as a constituent of an aqueous monomer emulsion comprising the total amount of monomers A and the remainders of monomers B. The amount of dispersant, particularly of the emulsifiers, in polymerization stage 1 is selected such that it is ≧2 mmol, preferably ≧5 mmol, per 10 g of monomers A and/or B.

The free-radically initiated aqueous emulsion polymerization is triggered by means of a free-radical polymerization initiator (free-radical initiator). These initiators may, in principle be both peroxides and azo compounds. It will be appreciated that redox initiator systems are contemplated as well. Peroxides used may in principle be inorganic peroxides, such as hydrogen peroxide or peroxodisulfates, such as the mono- or di-alkali metal salts or ammonium salts of peroxodisulfuric acid, such as, for example their mono- and di-sodium, -potassium or ammonium salts or organic peroxides, such as alkyl hydroperoxides, examples being tert-butyl, p-menthyl or cumyl hydroperoxide, and also dialkyl or diaryl peroxides, such as di-tert-butyl peroxide or dicumyl peroxide. Used as an azo compound are essentially 2,2'-azobis(isobutyronitrile), 2,2'-azobis(2,4-dimethylvaleronitrile) and 2,2'-azobis(amidinopropyl)dihydrochloride (AIBA, corresponding to V-50 from Wako Chemicals). Suitable oxidizing agents for redox initiator systems are essentially the peroxides stated above. As corresponding reducing agents it is possible to use sulfur compounds with a low oxidation state, such as alkali metal sulfites, examples being potassium and/or sodium sulfite, alkali metal hydrogensulfites, examples being potassium and/or sodium hydrogensulfite, alkali metal metabisulfites, examples being potassium and/or sodium metabisulfite, formaldehyde sulfoxylates, examples being potassium and/or sodium formaldehyde sulfoxylate, alkali metal salts, especially potassium salts and/or sodium salts, of aliphatic sulfinic acids and alkali metal hydrogensulfides, such as potassium and/or sodium hydrogensulfide, for example, salts of polyvalent metals, such as iron(II) sulfate, iron(II) ammonium sulfate, iron(II) phosphate, enediols, such as dihydroxymaleic acid, benzoic and/or ascorbic acid and also reducing saccharides, such as sorbose, glucose, fructose and/or dihydroxyacetone. In general the amount of free-radical initiator used, based on the total monomer amount is 0.01% to 5%, preferably 0.1% to 3% and with particular preference 0.1% to 1.5% by weight.

In accordance with the invention it is possible to include the total amount of the free-radical initiator in the initial charge in the aqueous polymerization medium before the polymerization reaction is initiated, in polymerization stage 1. An alternative possibility is to include, if desired, only a portion of the free-radical initiator in the initial charge in the aqueous polymerization medium before the polymerization reaction is initiated, in polymerization stage 1, and then to add the total amount or any remainder, under polymerization conditions during the inventive free-radical emulsion polymerization, in polymerization stage 1, polymerization stage 2 and polymerization stage 3, in accordance with the rate at which it is consumed, discontinuously in one or more portions or continuously with constant or varying volume flows.

By initiation of the polymerization reaction is meant the start of the polymerization reaction of the monomers present in the aqueous polymerization medium, following formation of free radicals by the free-radical initiator. This initiation of the polymerization reaction may take place by addition of free-radical initiator to the aqueous polymerization medium in the polymerization vessel under polymerization conditions. An alternative possibility is to add a portion or the entirety of the free-radical initiator to the aqueous polymerization medium, comprising the monomers A and/or B included in the initial charge, in the polymerization vessel, in polymerization stage 1, under conditions which are not suitable to trigger a polymerization reaction, such as at low temperature, for example, and thereafter to set polymerization conditions in the aqueous polymerization medium. Polymerization conditions are, generally speaking, those temperatures and pressures under which the free-radically initiated aqueous emulsion polymerization proceeds at a sufficient polymerization rate. They are dependent in particular on the free-radical initiator used. Advantageously, the nature and amount of the free-radical initiator, the polymerization temperature and the polymerization pressure are selected such that there are always sufficient initiating radicals available to initiate and maintain the polymerization reaction.

The reaction temperature contemplated for the free-radical aqueous emulsion polymerization of the invention spans the entire range from 0 to 170° C. Temperatures employed in this case are generally from 50 to 120° C., frequently 60 to 110° C. and often 70 to 100° C. The free-radical aqueous emulsion polymerization of the invention may be carried out at a pressure lower than, equal to or greater than 1 atm (atmospheric pressure), and so the polymerization temperature may exceed 100° C. and may be up to 170° C. Volatile monomers, such as ethylene, butadiene or vinyl chloride, for example, are polymerized preferably at elevated pressure. In that case the pressure may adopt 1.2, 1.5, 2, 5, 10, 15 bar (absolute) or even higher values. Where emulsion polymerizations are carried out at subatmospheric pressure, pressures of 950 mbar, frequently of 900 mbar and often 850 mbar (absolute) are set. The free-radical aqueous emulsion polymerization of the invention is carried out advantageously at 1 atm in the absence of oxygen, such as under an inert gas atmosphere, for example, such as under nitrogen or argon for example.

The aqueous reaction medium may in principle also comprise minor amounts (≦5% by weight) of water-soluble organic solvents, such as, for example methanol, ethanol, isopropanol, butanols, pentanols, but also acetone, etc. Preferably, however, the process of the invention is carried out in the absence of such solvents.

Besides the aforementioned components it is also possible in the process of the invention to make use, optionally, of free-radical chain transfer compounds in order to control or reduce the molecular weight of the polymers obtainable through the polymerization. In that case, use is made substantially of aliphatic and/or araliphatic halogen compounds, such as for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thiol compounds, such as primary, secondary or tertiary aliphatic thiols, such as, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxyethanethiol, aromatic thiols, such as benzenethiol, ortho-, meta-, or para-methylbenzenethiol, and also all other sulfur compounds described in Polymer Handbook $3^{rd}$ edition, 1989, J. Brandrup and E. H. Immergut, John Wiley & Sons, Section II, pages 133 to 141, but also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane or hydrocarbons having readily abstractable hydrogen atoms, such as toluene, for example. It is also possible, however, to use mixtures of mutually nondisrupting aforementioned free-radical chain transfer compounds.

The total amount of the free-radical chain transfer compounds optionally used in the process of the invention, based on the total monomer amount, is generally $\leq 5\%$, often $\leq 3\%$, and frequently $\leq 1\%$ by weight.

Frequently it is advantageous if a portion or the entirety of the optionally employed free-radical chain transfer compound is supplied to the aqueous polymerization medium prior to the initiation of the free-radical emulsion polymerization in polymerization stage 1. It is especially advantageous, however, if a portion or the entirety of the optionally employed free-radical chain transfer compound is supplied to the aqueous polymerization medium together with the monomers A and monomers B in polymerization stage 2 and/or 3.

It is essential to the invention that in the aqueous polymerization medium in polymerization stage 1, first only 0.1% to 10%, advantageously $\geq 1\%$ and $\leq 8\%$, and with particular advantage $\geq 2$ and $\leq 6\%$ by weight of the total amount of the at least one monomer A and/or B is introduced and polymerized, and subsequently in polymerization stages 2 and 3, the remainders of the at least one monomer A and of the at least one monomer B are added to the aqueous polymerization medium under polymerization conditions and are polymerized.

In this context, the metering of the remainders of the monomers A and of the monomers B in polymerization stages 2 and 3 may take place discontinuously in one or more portions or continuously, with constant or varying volume flows. The metering of the monomers A and B takes place preferably continuously with constant volume flows. The remainders of the monomers A and of the monomers B can also be metered in separate individual streams or as a monomer mixture. The remainders of the monomers A and of the monomers B are metered preferably as a monomer mixture, with particular advantage in the form of an aqueous monomer emulsion. It is essential that, in accordance with the invention, the intention is to encompass those variants of the process as well in which the compositions of the respective monomers A and/or monomers B change in polymerization stages 2 and 3, in—for example—a gradient procedure or staged procedure, which is familiar to a person skilled in the art. With advantage, the addition of the monomers A and/or of the monomers B in polymerization stages 2 and 3 takes place frequently in accordance with the gradient procedure or the staged procedure, and with particular advantage by the staged procedure.

With particular advantage, the process of the invention takes place such that the monomers A and/or B are reacted in polymerization stage 1, or the monomers A and B are reacted in polymerization stages 2 and 3, to a conversion of $\geq 95\%$, advantageously $\geq 98\%$ and with particular advantage $\geq 99\%$, by weight. Frequently it is advantageous if the aqueous polymer dispersion obtained after the end of polymerization stages 2 and 3 is subjected to an aftertreatment for the purpose of reducing the residual monomer content. This aftertreatment takes place either chemically, as for example by completion of the polymerization reaction through the use of a more effective free-radical initiator system (known as postpolymerization), and/or physically, as for example by stripping of the aqueous polymer dispersion with steam or inert gas. Corresponding chemical and/or physical methods are familiar to a person skilled in the art [see, for example, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586 and 198 47 115]. The combination of chemical and physical aftertreatment affords the advantage that, in addition to the unreacted ethylenically unsaturated monomers, other disruptive volatile organic constituents (the so-called VOCs [volatile organic compounds]) are removed from the aqueous polymer dispersion.

The aqueous polymer dispersions obtainable by the process of the invention have polymer particles whose weight-average diameter $D_w$ is in the range $\geq 10$ and $\leq 500$ nm, preferably $\geq 20$ and $\leq 200$ nm and with particular preference $\geq 30$ nm to $\leq 60$ nm. The determination of the weight-average particle diameter is known to a person skilled in the art and takes place, for example, via the method of the analytical ultracentrifuge. Weight-average particle diameter refers in this specification to the weight-average $D_{w50}$ value as determined by the method of the analytical ultracentrifuge (in this regard, cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

The aqueous polymer dispersions obtainable by the process of the invention and having weight-average particle diameters $D_w \leq 60$ nm exhibit a surprisingly good blocking resistance and are therefore especially suitable as binders for the coating of substrates, more particularly in transparent, aqueous formulations for wood coatings.

Advantages frequently become apparent here, such as a reduced need for thickeners in order to set a particular viscosity, and also good and low coloring when using color pigments, high penetration capacity on the part of the formulation into the wood surface, or good "highlighting" of the wood grain. Moreover, the aqueous polymer dispersions of the invention exhibit improved filterability as compared with corresponding noninventive aqueous polymer dispersions.

Furthermore, the corresponding polymer powders are obtainable from the aqueous polymer dispersions of the invention in a simple manner (by freeze or spray drying, for example). These inventively accessible polymer powders can likewise be employed as a component in the production of adhesives, sealants, synthetic renders, paper coating slips, fiber webs, paints, and coating materials for organic substrates, and also for modifying mineral binders.

The aqueous polymer dispersion typically has a solids content of 20% to 70% by weight, preferably 40% to 65% by weight.

The aqueous polymer dispersion obtained can be used, as it is or mixed with further, generally film-forming polymers, as a binder composition in aqueous coating materials, such as paint or varnish mixtures.

It will be appreciated that the aqueous polymer dispersions of the invention that are obtainable by the process of the invention can also be used as a component in the production of adhesives, sealants, synthetic renders, paper coating slips, fiber webs, paints, and coating materials for organic substrates, and also for modifying mineral binders.

The invention further provides a coating material in the form of an aqueous composition comprising at least one polymer dispersion as defined above.

The binder compositions of the invention are employed preferably in aqueous paints. These paints take the form, for example of an unpigmented system (clear varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments and fillers in a dried coating film in percent: $PVC = (V_P + V_F) \times 100/(V_P + V_F + V_B)$. Paints can be classified on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| high-gloss paint | about 15-25 |
| exterior masonry paint, white | about 45-55 |
| clear varnish | 0 |

The invention further provides a coating material in the form of an aqueous composition comprising
- at least one polymer dispersion of the invention, as defined above,
- if desired, at least one inorganic filler and/or at least one inorganic pigment,
- if desired, at least one typical auxiliary, and
- water.

The coating materials of the invention in the form of an aqueous composition are employed preferably as paints. One preferred embodiment is paints in the form of a clear varnish. Another embodiment is paints in the form of an emulsion paint.

With particular preference the polymer dispersions of the invention are suitable as binders for producing paints for wood coatings.

Examples of suitable pigments are inorganic white pigments such as titanium dioxide, preferably in the rutile form, barium sulfate, zinc oxide, zinc sulfide, basic lead carbonate, antimony trioxide, lithopones, (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal-complex pigments. Also suitable are synthetic white pigments with air inclusions for increasing light scattering, such as the Ropaque® dispersions. Additionally suitable are the Luconyl® grades from BASF SE, such as Luconyl® yellow, for example.

Suitable fillers are, for example, aluminosilicates, such as feldspars, silicates, such as kaolin, talc, mica, magnesite, alkaline earth metal carbonates, such as calcium carbonate, in the form, for example, of calcite or chalk, magnesium carbonate, dolomite, alkaline earth metal sulfates, such as calcium sulfate, silicon dioxide, etc. In paints, of course, finely divided fillers are preferred. The fillers can be employed as individual components. In actual practice, however, filler mixtures have proven particularly appropriate, examples being calcium carbonate/kaolin and calcium carbonate/talc. Glossy paints generally include only small amounts of very finely divided fillers, or comprise no fillers.

Finely divided fillers may also be used to increase the hiding power and/or to save on white pigments. In order to adjust the hiding power, the hue and the depth of color, it is preferred to employ blends of color pigments and fillers.

The coating material of the invention (aqueous paints) may, in addition to the polymer dispersion, comprise, if desired, additional film-forming polymers, pigment and other auxiliaries.

The typical auxiliaries include, in addition to the emulsifiers used in the polymerization, wetting agents or dispersants, such as sodium, potassium or ammonium polyphosphate, alkali metal salts and ammonium salts of acrylic acid copolymers or maleic anhydride copolymers, polyphosphonates, such as sodium 1-hydroxyethane-1,1-diphosphonate, and also salts of naphthalenesulfonic acids, more particularly their sodium salts.

Other suitable auxiliaries are flow control agents, defoamers, biocides, and thickeners. Suitable thickeners are exemplified by associative thickeners, such as polyurethane thickeners. The amount of the thickener is preferably less than 1% by weight, more preferably less than 0.6% by weight, thickener, based on paint solids content.

The paints of the invention are produced in a known way by blending the components in mixing equipment customary for the purpose. It has been found appropriate to prepare an aqueous paste or dispersion from the pigments, the water, and where used, the auxiliaries and only then to mix the polymeric binder, i.e., in general the aqueous dispersion of the polymer, with the pigment paste or pigment dispersion.

The paints of the invention comprise generally 30% to 75% by weight and preferably 40% to 65% by weight of nonvolatile constituents. By these are meant all those constituents of the preparation that are not water, but at least the total amount of binder, pigment, and auxiliary, based on the solids content of the paint. The volatile constituents are predominantly water.

The paint of the invention may be applied to substrates in a typical way, as for example by spreading, spraying, dipping, rolling, knife coating, etc.

The paint is used preferably as an architectural paint, i.e., for the coating of buildings or parts of buildings. In this context the substrates in question may be mineral substrates such as renders, plaster or plasterboard panels, masonry or concrete, or wood, woodbase materials or metal, paper, wallpapers for example, or plastic, such as PVC; preferably the substrate is wood.

The paints of the invention are notable for ease of handling and good processing properties. Their pollutant content is low. They have good performance properties, such as good water resistance, good wet adhesion and good blocking resistance, for example and have good recoatability, and exhibit good flow on application. The equipment used is easily cleaned with water.

The invention is illustrated by the following, nonlimiting examples.

EXAMPLES a) Preparation of the Aqueous Polymer Dispersions

The solids content was generally determined by drying a defined amount of the aqueous polymer dispersion (approximately 1 g) to constant weight in a drying cabinet at 140° C., in an aluminum crucible having an internal diameter of approximately 5 cm. Two separate measurements were carried out. The values reported in the examples represent the average value of each of the two results.

The light transmittance (LT) was determined generally by means of a sample of the aqueous polymer dispersion diluted with deionized water to a polymer solids content of 40% by weight, using a DR/2010 spectrometer from Hach, Germany. Measurement is made relative to water, which is assigned an LT of 100%.

The minimum film-forming temperature (MFFT) was determined along the lines of Ullmanns Enzyklopädie der technischen Chemie, 4th edn., vol. 19, Verlag Chemie, Weinheim (1980), p. 17. The instrument used was a film-forming bar (a metal plate to which a temperature gradient is applied). The filming took place at a wet film thickness of 1 mm. The minimum film-forming temperature reported is the temperature at which the film begins to become fissured.

Inventive Example 1 (IE1)

A polymerization vessel equipped with metering devices and temperature regulation was charged at 20 to 25° C. (room temperature) under a nitrogen atmosphere with
559.0 g of deionized water and
66.7 g of a 15% strength by weight aqueous solution of sodium lauryl sulfate,
and this initial charge was heated to 87° C. with stirring. When the initial charge had reached that temperature, 50 g of methyl methacrylate and 10 g of a 50% strength by weight aqueous solution of the sodium salt of acrylamido-2-methyl-propanesulfonic acids) were added, and emulsification rook place for half a minute. Subsequently, with the temperature maintained, 2.9 g of feed 3 were added and polymerization took place for 5 minutes. Thereafter, beginning at the same time, feed 1 was metered in continuously over the course of 120 minutes and, in parallel, the remainder of feed 3 was metered in continuously over the course of 180 minutes, with constant volume flows. After the end of feed 1, and after a 15-minute waiting time, feed 2 was commenced and was metered in continuously over the course of 45 minutes with constant volume flow.

Feed 1 (homogeneous mixture of):

| | |
|---|---|
| 411.9 g | deionized water |
| 34.0 g | a 15% strength by weight aqueous solution of sodium lauryl sulfate |
| 492.0 g | n-butyl acrylate |
| 159.2 g | methyl methacrylate |
| 8.4 g | a 50% strength by weight aqueous solution of acrylamide |
| 7.5 g | methacrylic acid and |
| 47.1 g | a 25% strength by weight solution of ureido methacrylate in methyl methacrylate[b] |

Feed 2 (homogeneous mixture of):

| | |
|---|---|
| 151.6 g | deionized water |
| 12.0 g | a 15% strength by weight aqueous solution of sodium lauryl sulfate |
| 6.8 g | methacrylic acid |
| 30.1 g | a 25% strengtn by weight solution of ureido methacrylate in methyl methacrylate[b] and |
| 203.1 g | methyl methacrylate |

Feed 3 (homogeneous solution of):

| | |
|---|---|
| 26.6 g | deionized water and |
| 2.0 g | sodium peroxodisulfate |

[a]Lubrizol ® 2405 from Lubrizol Deutschland GmbH
[b]Plex ® 6844-O from Röhm GmbH.

After the end of feeds 2 and 3, the polymerization mixture was left to react for 30 minutes more at 87° C. After that, beginning simultaneously and via separate feed lines, 16 g of a 5% strength by weight aqueous hydrogen peroxide solution and a solution of 1.4 g of ascorbic acid and 67 g of deionized water, were metered into the polymerization mixture continuously over the course of 60 minutes, with constant volume flows.

Thereafter the aqueous polymer dispersion obtained was cooled to room temperature, neutralized with 8.4 g of a 25% strength by weight aqueous ammonia solution and filtered through a 125 µm filter.

This gave 2370 g of the aqueous polymer dispersion, having a solids content of 42.2% by weight and an MFFT of 11° C.

The aqueous polymer dispersion diluted with deionized water to a solids content of 40% by weight had a light transmittance of 11% and a weight-average particle diameter of 56 nm.

Comparative Example 1 (CE1)

A polymerization vessel equipped with metering devices and temperature regulation was charged at 20 to 25° C. (room temperature) under a nitrogen atmosphere with
200.8 g of deionized water and
35.0 g of a 15% strength by weight aqueous solution of sodium lauryl sulfate,
and this initial charge was heated to 87° C. with stirring, and, when it had reached that temperature, 29.8 g of feed 1 and subsequently, with the temperature maintained, 2.0 g of feed 3 were added and polymerization took place for 5 minutes. Thereafter, beginning at the same time, the remainder of feed 1 was metered in continuously over the course of 120 minutes and, in parallel, the remainder of feed 3 was metered in continuously over the course of 165 minutes, with constant volume flows. After the end of feed 1, feed 2 was commenced and was metered in continuously over the course of 45 minutes, with constant volume flow.

Feed 1 (homogeneous mixture of):

| | |
|---|---|
| 329.1 g | deionized water |
| 23.3 g | a 15% strength by weight aqueous solution of sodium lauryl sulfate |
| 5.7 g | a 50% strength by weight aqueous solution of acrylamide |
| 5.1 g | acrylic acid |
| 27.0 g | a 25% strength by weight solution of ureido methacrylate in methyl methacrylate[b] |
| 199.2 g | methyl methacrylate and |
| 285.5 g | 2-ethylhexyl acrylate |

Feed 2 (homogeneous mixture of):

| | |
|---|---|
| 174.4 g | deionized water |
| 8.9 g | a 15% strength by weight aqueous solution of sodium lauryl sulfate |
| 5.1 g | acrylic acid |
| 27.0 g | a 25% strength by weight solution of ureido methacrylate in methyl methacrylate[b] and |
| 148.2 g | methyl methacrylate |

Feed 3 (homogeneous solution of):

| | |
|---|---|
| 13.0 g | deionized water and |
| 1.0 g | sodium peroxodisulfate |

After the end of feeds 2 and 3, the polymerization mixture was left to react for 30 minutes more at 87° C. After that, beginning simultaneously and via separate feed lines, 22.4 g of a 5% strength by weight aqueous hydrogen peroxide solution and a solution of 1.0 g of ascorbic acid and 26.5 g of deionized water, were metered into the polymerization mixture continuously over the course of 60 minutes, with constant volume flows.

Thereafter the aqueous polymer dispersion obtained was cooled to room temperature, neutralized with 5.9 g of a 25% strength by weight aqueous ammonia solution and filtered through a 125 μm filter.

The resulting 1544 g of the aqueous polymer dispersion had a solids content of 45.2% by weight. The MFFT was 13° C. The aqueous polymer dispersion diluted with deionized water, had a light transmittance of 1% and a weight-average particle diameter of 63 nm.

Comparative Example 2 (CE2)

A polymerization vessel equipped with metering devices and temperature regulation was charged at 20 to 25° C. (room temperature) under a nitrogen atmosphere with
346.3 g of deionized water and
201.2 g of a 15% strength by weight aqueous solution of sodium lauryl sulfate,
and this initial charge was heated to 87° C. with stirring, and, when it had reached that temperature, 57.4 g of feed 1 and subsequently, with the temperature maintained, 3.5 g of feed 3 were added and polymerization took place for 5 minutes. Thereafter, beginning at the same time, the remainder of feed 1 was metered in continuously over the course of 120 minutes and, in parallel, the remainder of feed 3 was metered in continuously over the course of 165 minutes, with constant volume flows. After the end of feed 1, feed 2 was commenced and was metered in continuously over the course of 45 minutes, with constant volume flow.

Feed 1 (homogeneous mixture of):

| | |
|---|---|
| 744.7 g | deionized water |
| 41.0 g | a 15% strength by weight aqueous solution of sodium lauryl sulfate |
| 10.1 g | a 50% strength by weight aqueous solution of acrylamide |
| 9.5 g | methacrylic acid |
| 56.9 g | a 25% strength by weight solution of ureido methacrylate in methyl methacrylate[b)] |
| 342.3 g | methyl methacrylate and |
| 504.0 g | 2-ethylhexyl acrylate |

Feed 2 (homogeneous mixture of):

| | |
|---|---|
| 154.1 g | deionized water |
| 14.5 g | a 15% strengtn by weight aqueous solution of sodium lauryl sulfate |
| 8.2 g | methacrylic acid |
| 36.3 g | a 25% strength by weight solution of ureido methacrylate in methyl methacrylate[b)] and |
| 245.1 g | methyl methacrylate |

Feed 3 (homogeneous solution of):

| | |
|---|---|
| 32.1 g | deionized water and |
| 2.4 g | sodium peroxodisulfate |

After the end of feeds 2 and 3, the polymerization mixture was left to react for 30 minutes more at 87° C. After that, beginning simultaneously and via separate feed lines, 38.6 g of a 5% strength by weight aqueous hydrogen peroxide solution and a solution of 1.7 g of ascorbic acid and 37.0 g of deionized water, were metered into the polymerization mixture continuously over the course of 60 minutes, with constant volume flows.

Thereafter the aqueous polymer dispersion obtained was cooled to room temperature, neutralized with 10.1 g of a 25% strength by weight aqueous ammonia solution and filtered through a 125 μm filter.

This gave 2835 g of the aqueous polymer dispersion. It had a solids content of 43.0% by weight and an MFFT of 10° C. The aqueous polymer dispersion, diluted with deionized water had a light transmittance of 10%. The weight-average particle diameter was 44 nm.

b) Performance Investigations

The aqueous polymer dispersions were diluted with deionized water to a solids content of 37.5% by weight. 246.9 g of each of these dilute aqueous polymerization dispersions were added at room temperature as binder, to a base coating stain formulation, composed of

| | |
|---|---|
| 26.4 g | deionized water |
| 3.0 g | Mergal ® S 96 (fungicide from Troy Chemie GmbH) |
| 0.3 g | AMP ® 90 (neutralizing agent from Angus Chemical Company) |
| 0.3 g | Silikentensid ® Byk 346 (wetting agent from Byk-Chemie GmbH) |
| 0.6 g | Tego Foamex ® 810 (defoamer from Tego Chemie Service GmbH) |
| 1.5 g | Coatex ® BR 100 P (thickener from Cognis Deutschland GmbH & Co KG) |
| 9.0 g | Luconyl ® yellow, liquid (pigment from BASF SE) |
| 6.0 g | propylene glycol |
| 3.0 g | butyldiglycol |
| 3.0 g | white spirit K 60 (solvent from Shell) | and mixed homogeneously.

Blocking Test

300 μm of wet film thickness on pine, pressed against one another after 24 h of drying at 200 g/cm² for 24 hours. Pressed against one another, after 7 d of drying, with 400 g/cm².

To test the blocking resistance of the preservative wood stains produced, square specimens with an edge length of 2 cm were cut from Leneta sheets (PVC sheets, sintered and blackened with carbon black, from Schwegmann GmbH at D-53501 Grafschaft Gelsdorf), coated with 100 μm wet film thickness of the stains, after 24 h of drying at 23° C. and 50% relative humidity, and pairs of these cut specimens were pressed against one another by their coated sides over a period of 1 h or 24 h, subjected to a mass of 5 kg, at 60° C. Subsequently the specimens, after cooling to 23° C., were parted from one another again, and a peel force needed for this, and also the resultant film quality, were assessed in accordance with the following scale of values:

0: specimens tail apart under their own weight; the films remain undamaged;

1: specimens can be separated without significant force; the films remain undamaged;

2: parting the specimens requires a low force; the films remain undamaged;

3: parting the specimens requires an increased force; the film suffers small holes and cracks;

4: separating the specimens requires a high force; the films suffer greater holes and cracks;

5: the specimens can be separated only with application of very great force and the films suffer severe damage on separation.

Wet Transparency

Test instruments and test accessories: Teflon-coated stainless steel plates 600×500×10 mm, Erichsen trim drawer 1000 μm Procedure: the stain under test is applied to the Teflon-coated stainless steel plate using a 1000 μm Erichsen film drawer. The experimental series is immediately assessed in comparison following the application, visually, using six-point ratings.

0=totally transparent
1=trace of haze
2=slight haze
3=moderate haze
4=severe haze
5=opaque Foam Number Test equipment and test accessories: foam testing machine (in-house construction, piston method), 100 ml measuring cylinder, stopwatch Procedure: mix 15 ml of dispersion with 15 ml of fully demineralized water. Fill 100 ml measuring cylinder up to the 30 ml mark with test liquid.

Evaluation: read of foam number after 20, 40, 60, 80 seconds: the height of the foam on the scale of the measuring cylinder.

Foam Collapse

Test equipment and test accessories: foam testing machine (in-house construction, piston method), 100 ml measuring cylinder, stopwatch Procedure: mix 15 ml of dispersion with 15 ml of fully demineralized water. Fill 100 ml measuring cylinder up to the 30 ml mark with test liquid.

Evaluation: read off drop of foam after 1 min and after 5 minutes: the height of the foam on the scale of the measuring cylinder.

| Results[a] | | | 1E1 2 | CE 1 5 | CE 2 3 |
|---|---|---|---|---|---|
| Wet transparency | | | | | |
| Blocking test | 200 g/cm² | force | 1-2 | 1 | 3 |
| | | tearing | 0 | 0 | 1 |
| | 400 g/cm² | force | 1-2 | 1 | 1-2 |
| | | tearing | 0 | 0 | 0 |
| Foam number | | after 20" | 52 | 58 | 68 |
| | | after 40" | 55 | 65 | 73 |
| | | after 60" | 58 | 68 | 77 |
| | | after 80" | 58 | 68 | 82 |
| Foam collapse | | after 1" | 54 | 65 | 80 |
| | | after 5" | 45 | 52 | 74 |

[a] Wet transparency, force and tearing in six-point scale; foam number and foam collapse in ml.

The invention claimed is:

1. An aqueous polymer dispersion obtained by a process comprising:
   (a) polymerizing, in the presence of at least one emulsifier and a free-radical initiator, a monomer composition I comprising in an aqueous polymerization medium:
      0.1% to 10% by weight of a monomer A, a monomer B, or both; and
      0.1% to 10% by weight of a hydrophilic monomer of formula (1)

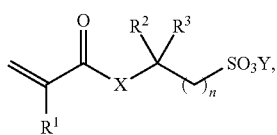

(1)

wherein
   n represents 0 to 2,
   $R^1$, $R^2$ and $R^3$ independently represent hydrogen or a methyl group,
   X represents oxygen or an imino group (NH), and
   Y represents hydrogen, an alkali metal, or ammonium, to form an in situ seed, comprising hydrophilic and hydrophobic monomers; then
   (b) polymerizing a a monomer composition II comprising:
      40%-60% by weight of the monomer A, a homopolymer of which has a glass transition temperature below 20° C.;
      15%-30% by weight of the monomer B, a homopolymer of which has a glass transition temperature above 50° C.;
      0.1%-5% by weight of a monomer C comprising an α,β-unsaturated carboxylic, sulfonic, phosphonic acid, carboxamide, or mixture thereof, which is copolymerizable with the monomer B;
      0%-5% by weight of a monomer D comprising an ethylenically unsaturated monomer comprising a keto group, a non-C, ethylenically unsaturated, and nitrogen-comprising adhesion monomer, or both; and
      0%-5% by weight of an ethylenically unsaturated monomer E; and
   (c) polymerizing a monomer composition III comprising:
      0%-5% by weight of the monomer A, a homopolymer of which has a glass transition temperature below 20° C.;
      10%-30% by weight of the monomer B, a homopolymer of which has a glass transition temperature above 50° C.;
      0.1%-5% by weight of the monomer C comprising an α,β-unsaturated carboxylic, sulfonic, phosphonic acid, carboxamide, or mixture thereof, which is copolymerizable with the monomer B;
      0%-5% by weight of the monomer D comprising an ethylenically unsaturated monomer comprising a keto group, a non-C, ethylenically unsaturated, and nitrogen-comprising adhesion monomer, or both; and
      0%-5% by weight of the ethylenically unsaturated monomer E,
   wherein the sum of the monomer compositions I+II+III equals 100%.

2. The dispersion of claim 1, wherein a weight-average particle diameter is ≦60 nm.

3. The dispersion of claim 1, wherein an amount of the emulsifier is less than 2 parts by weight per 100 parts by weight of the sum of the monomer compositions I+II+III.

4. The dispersion of claim 1, wherein the monomer A is at least one selected from the group consisting of ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, and 2-propylheptyl acrylate.

5. The dispersion of claim 1, wherein a minimum film-forming temperature of the polymer dispersion is in the range from 0 to 20° C.

6. A process for preparing an aqueous polymer dispersion, the process comprising:
   (a) polymerizing, in the presence of at least one emulsifier and a free-radical initiator, a monomer composition I comprising in an aqueous polymerization medium:
      0.1% to 10% by weight of a monomer A, a monomer B, or both; and
      0.1% to 10% by weight of a hydrophilic monomer of formula (1)

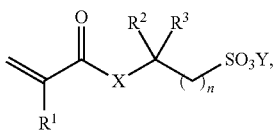

(1)

wherein
n represents 0 to 2,
R¹, R² and R³ independently represent hydrogen or a methyl group,
X represents oxygen or an imino group (NH), and
Y represents hydrogen, an alkali metal or ammonium
to form an in situ seed comprising hydrophilic and hydrophobic monomers; then (b) polymerizing a monomer composition II comprising:
40%-60% by weight of the monomer A, a homopolymer of which has a glass transition temperature below 20° C.;
15%-30% by weight of the monomer B, a homopolymer of which has a glass transition temperature above 50° C.;
0.1%-5% by weight of a monomer C comprising an α,β-unsaturated carboxylic, sulfonic, phosphonic acid, carboxamide, or mixture thereof, which is copolymerizable with the monomer B;
0%-5% by weight of a monomer D comprising an ethylenically unsaturated monomer comprising a keto group, a non-C, ethylenically unsaturated, and nitrogen-comprising adhesion monomer, or both; and
0%-5% by weight of an ethylenically unsaturated monomer E; and (c) polymerizing a monomer composition III comprising:
0%-5% by weight of the monomer A, a homopolymer of which has a glass transition temperature below 20° C.;
10%-30% by weight of the monomer B, a homopolymer of which has a glass transition temperature above 50° C.;
0.1%-5% by weight of the monomer C comprising an α,β-unsaturated carboxylic, sulfonic, phosphonic acid, carboxamide, or mixture thereof, which is copolymerizable with the monomer B;
0%-5% by weight of the monomer D comprising an ethylenically unsaturated monomer comprising a keto group, a non-C, ethylenically unsaturated, and nitrogen-comprising adhesion monomer, or both; and
0%-5% by weight of the ethylenically unsaturated monomer E, wherein:
the sum of the monomer compositions I+II+III equals 100%;
and
only 0.1% to 10% by weight of the monomer A, monomer B, or both, is introduced into the aqueous polymerization medium during the polymerizing (a), and subsequently to the polymerization (b) and (c) the remainder of the monomer A, the monomer B, or both, is added to the aqueous polymerization medium under polymerization conditions.

7. The process of claim 6, wherein a portion of dispersants is included in an initial charge in the aqueous polymerization medium together with the monomer A, monomer B, or both, and the hydrophilic monomer 1 and any remainder is metered into the aqueous polymerization medium in the polymerization (b) and (c) discontinuously, in one or more portions, or continuously with constant or varying volume flows.

8. The process of claim 6, wherein an amount of a dispersant in the polymerization (a) is ≧2 mmol per 10 g of the monomer A, the monomer B, or both.

9. A coating material, comprising:
the aqueous polymer dispersion of claim 1;
optionally an inorganic filler, an inorganic pigment, or both;
optionally an auxiliary; and
water.

10. The coating material of claim 9, wherein the coating material is a paint.

11. The coating material of claim 9, wherein the coating material is a clear varnish.

12. The coating material of claim 9, wherein the coating material is a paint for wood coatings.

13. A binder for producing a coating material, the binder comprising the dispersion of claim 1.

14. A binder for producing a paint for wood coatings, the binder comprising the dispersion of claim 1.

* * * * *